Aug. 12, 1941.　　　A. C. LINDGREN　　　2,252,383
BASIN-FORMING DEVICE
Filed Aug. 17, 1938

Inventor
Alexus C. Lindgren
By V. F. Lamagne
Att'y.

Patented Aug. 12, 1941

2,252,383

UNITED STATES PATENT OFFICE 2,252,383

BASIN-FORMING DEVICE

Alexus C. Lindgren, Chicago, Ill., assignor to International Harvester Company, a corporation of New Jersey Application August 17, 1938, Serial No. 225,337

6 Claims. (Cl. 97—55)

This invention relates to a basin-forming attachment for planters or the like. More specifically, it relates to a device for forming water retaining pits on either side of a furrow in which seed is planted, and to a method of planting and forming basins or pits.

Basin-forming devices of various forms are well known. They are also known in connection with planters by which planting is done in a furrow, and dams are formed in the furrow. The forming of pits or dams in the line of planting has the disadvantage that the forming of the pit or dam may dig up the seed. Consequently, it is thought to be an advantage to form pits off the line of planting.

An object of this invention is to provide an improved device for planting seed and forming pits.

A further object of the invention is the provision of a device for planting and for forming pits off the line of planting.

Another object of the invention is the provision of a pit forming attachment which may be carried behind the covering wheels of a conventional planter for the formation of pits off the line of planting.

A further object is to provide for use with a corn planter, a pit plowing attachment which will form pits off the line of planting.

Still another object is the provision of a novel method of planting seed and forming pits.

A further object is an improved method for planting seed and simultaneously forming pits off the line of planting.

According to the present invention, a planter of conventional form is provided and the novel pit plowing attachment is carried at the rear thereof. The pit plowing attachment comprises a pair of stub shafts, one mounted at the rear of each covering wheel of the planter and carrying semicircular disks for forming the pits off the line of the planting.

In the drawing—

Figure 1:
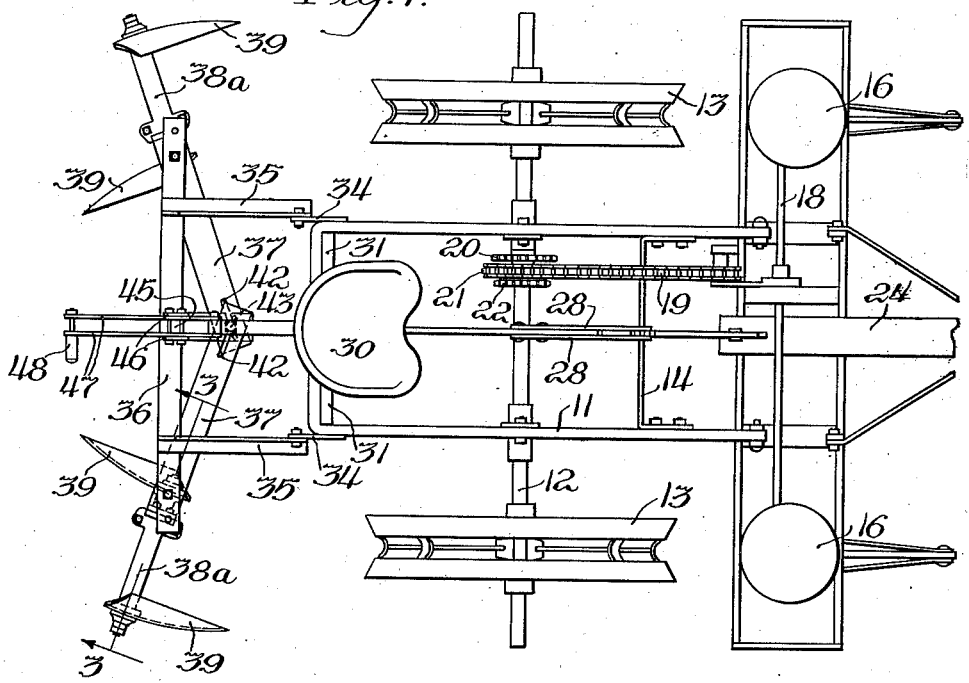
Figure 1 is a plan view of the novel form of pit forming attachment connected to a planter.

Numeral 10 represents a planter of well known form, such as shown in the patent to Ford, No. 1,443,173 of January 23, 1923. There is a first frame 11 which is supported by means of a shaft 12 on which, at its outer ends, covering wheels 13 are journaled. A cross member 14 extends between the sides of the U-shaped frame. There are seed cans 16 carried at the forward end of the frame in front of the wheels, and beneath them seed boots 17 and runners 17ᵃ. Extending between the cans there is a shaft 18 driven by a sprocket chain 19 connectable to any one of three gears 20, 21 and 22 on the shaft 12. Rotation of the ground covering wheels 13 through the shaft 12, the gear 21, sprocket chain 19 and shaft 18 causes periodic dropping of the seed from the seed cans 16 down through the seed boots 17. A pole 24 extends forwardly from the front end of the planter and may be connected to any suitable source of draft, such as a horse or a tractor. The seed boots and runners may be raised and lowered as desired by means of a lever 25 held in the proper notch of an arcuate member 26 by detent mechanism 27. The arcuate member 26 is carried between a pair of members 28 in turn secured to a member 29 extending upwardly beneath an operator's seat 30. A member 31 supports the operator's seat and one end of the member 29.

The novel pit forming device will now be described. Secured at the rear of the first frame member 11 are bracket members 34 to which is pivotally attached a second frame which consists of a pair of rearwardly extending members 35, to which a cross member 36 is fixed or welded. A pair of L-shaped members 37 is adjustably pivoted near the ends of the cross member 36 and has depending arms carrying shafts 38 rotatably mounted in bearing sleeves 38ᵃ. At each end of the shafts 38 there is a pit forming element 39 of approximately semicircular shape. The inner ends of the horizontal arms of the L-shaped members 37 are slotted, as at 42, and receive therein a bolt 43. Adjustment of the L-shaped members is had by movement of their inner slotted ends longitudinally of the planter. A nut 44 on the bolt 43 is effective to hold the L-shaped members in any desired position. In this way regulation of the angle of the pit forming elements 39 is effected, the shafts 38, which carry them, being held in line with the L-shaped members 27. Provision of a plurality of bolt openings in the ends of the cross member 36 permits lateral adjustment of members 37.

Figure 2:
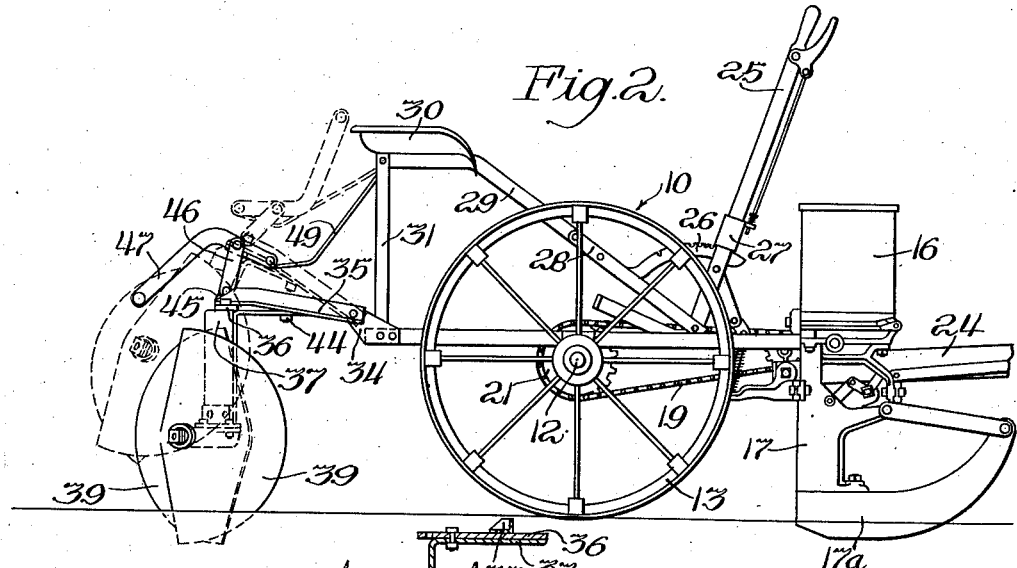
Figure 2 is a side view of the same.
Figure 3:
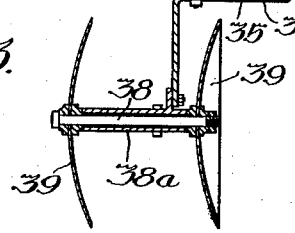
Figure 3 is a sectional detail view on line 3—3 Figure 1.

Attached to the upper side of the cross member 36 there is a bracket member 45, to which is pivotally connected a pair of links 46. Pivoted to the upper end of the links 46 there is a pair of members forming a lever 47, to one end of which is attached a handle member 48 and to the other end of which is connected a depending member 49 attached beneath the operator's seat 30. This last mentioned mechanism is effective to raise the pit plowing attachment from operating position to transport position. When this is desired, the handle 48 is moved upwardly and the lever 47 pivots about its point of attachment to the member 49. Thus, by virtue of the links 46, the pit plowing attachment is also raised and swung to an inoperative transport position, as indicated by dotted lines on Figure 2.

The pit forming elements mounted on each shaft 38 are shown as being 180 degrees out of phase with one another. The result is then that a pit on one side of the line of planting will be staggered with respect to the pit on the other side of the line of planting.

In operation the planter and pit forming attachment are moved along the ground, the seeds are dropped at regular intervals through the seed boots 17 into the furrow formed by the runner 17ª, and the wheels 13 cover up the seeds. The elements 39 then form pits on either side of the lines along which seed has been dropped. The result is two lines of planting with two lines of pits on both sides of each line of planting.

As previously stated, the angle of the pit forming elements can be regulated by an adjustment of the inner ends of the L-shaped members 37; the slots 42 allow this adjustment. The angle of the pit forming elements will determine the type of pit formed. If the L-shaped members 37 have a considerable angle with respect to the cross member 36, then the pits formed are of substantial size. If, however, the L-shaped members 37 are moved more nearly into alinement with the cross member 36, then the pits become smaller.

It will be apparent from the foregoing description that a novel pit forming attachment for planters has been provided, as well as a novel method of forming pits and of planting. The pit forming attachment is simple in construction and can be readily attached to planters of well known types. The intention is to limit the invention only to the terms of the appended claims.

What is claimed is:

1. A corn planter including a frame, means thereon for depositing corn, means for covering the corn carried rearwardly of the depositing means in alinement therewith, and basin-forming means carried rearwardly of the covering means and on both sides of and closely adjacent the line of the covering means and the depositing means.

2. A corn planter having a frame, a seed boot and runner mounted thereon, a covering wheel mounted on the frame rearwardly of the seed boot in alinement therewith, a shaft carried rearwardly of the covering wheel, and basin-forming elements mounted on the shaft and positioned on both sides of and closely adjacent the line of the covering wheel and the runner.

3. A corn planter having a frame, a pair of seed boots and runners mounted thereon, a pair of covering wheels rearwardly of the runners and in alinement therewith, a basin-forming device carried by the planter frame and including a pair of shafts carried rearwardly of the covering wheels, and pairs of basin-forming elements respectively mounted on the shafts, each pair straddling the line of the respective runner and covering wheel.

4. A planter comprising a first frame, runners and covering wheels in alinement on the first frame, a second frame movably connected to the first frame, means for adjusting the second frame with respect to the first frame, a plurality of basin-forming means mounted on the second frame at the sides of each of the alined runners and covering wheels, and means for adjusting the basin-forming means to affect the size of the basins.

5. A planter comprising a first frame, runners and covering wheels in alinement on the first frame, a second frame movably connected to the first frame, means for adjusting the second frame with respect to the first frame, L-shaped members adjustably secured on the second frame, and basin-forming means mounted on the L-shaped members on both sides of the alined runners and covering wheels.

6. A planter comprising a first frame, runners and covering wheels in alinement on the first frame, a second frame movably connected to the first frame, means for adjusting the second frame with respect to the first frame, a plurality of basin-forming means mounted on the second frame at the sides of each of the alined runners and covering wheels, said basin-forming means contacting the ground on the lowering of the second frame and forming basins on both sides of the alined runners and covering wheels as the planter moves over the ground.

ALEXUS C. LINDGREN.